(12) United States Patent
Giffin

(10) Patent No.: US 10,821,522 B2
(45) Date of Patent: Nov. 3, 2020

(54) DRILL BIT ADAPTER TOOL

(71) Applicant: Giffin Tec, Inc., Lummis Island, WA (US)

(72) Inventor: Brian Giffin, Lummi Island, WA (US)

(73) Assignee: Giffin Tec, Inc., Lummi Island, WA (US)

( * ) Notice: Subject to any disclaimer, the term of this patent is extended or adjusted under 35 U.S.C. 154(b) by 0 days.

(21) Appl. No.: 15/946,513

(22) Filed: Apr. 5, 2018

(65) Prior Publication Data
US 2018/0290214 A1   Oct. 11, 2018

Related U.S. Application Data

(60) Provisional application No. 62/482,088, filed on Apr. 5, 2017.

(51) Int. Cl.
*B23B 31/117* (2006.01)
*B25B 21/00* (2006.01)
(Continued)

(52) U.S. Cl.
CPC .......... *B23B 31/1173* (2013.01); *A45F 5/021* (2013.01); *B23B 31/107* (2013.01); *B25B 21/007* (2013.01); *B25B 23/0035* (2013.01); *A45F 2200/0575* (2013.01); *B23B 2231/04* (2013.01); *B25B 21/02* (2013.01); *Y10T 279/17786* (2015.01); *Y10T 408/95* (2015.01)

(58) Field of Classification Search
CPC . B23B 31/107; B23B 31/117; B23B 31/1173; B23B 51/12; B25B 23/0035; B25B 23/0042; Y10T 408/94; Y10T 408/95; Y10T 279/17153; Y10T 279/17188; Y10T 279/17786; Y10T 279/17794; Y10T 279/17811; Y10T 279/3406; Y10T 279/3412; Y10T 279/3418
See application file for complete search history.

(56) References Cited

U.S. PATENT DOCUMENTS

| 87,715 A | 3/1869 | Sible |
|---|---|---|
| 1,031,914 A | 7/1912 | Clouse |

(Continued)

FOREIGN PATENT DOCUMENTS

| DE | 889672 C | * | 9/1953 | ............. A61C 1/144 |
| DE | 1552404 | | 12/1969 | |

OTHER PUBLICATIONS

U.S. Appl. No. 29/659,104, filed Aug. 6, 2018, Giffin.
(Continued)

*Primary Examiner* — Alan Snyder
*Assistant Examiner* — Yasir A Diab
(74) *Attorney, Agent, or Firm* — Sheridan Ross P.C.

(57) ABSTRACT

An adapter tool with a drill bit is provided that selectively connects to a driver to provide added versatility to the driver. The adapter tool includes a spring with an engagement end that extends through a body to selectively engage a recess in the driver. A user can actuate the spring to quickly engage and disengage the adapter from the driver. In practice, a user can use the adapter-driver combination to drill a pilot hole using the drill bit on the adapter, selectively remove the adapter from the driver, and then put a screw into the pilot hole using the driver.

18 Claims, 8 Drawing Sheets

(51) Int. Cl.
*A45F 5/02* (2006.01)
*B25B 23/00* (2006.01)
*B23B 31/107* (2006.01)
*B25B 21/02* (2006.01)

(56) References Cited

U.S. PATENT DOCUMENTS

| | | | | |
|---|---|---|---|---|
| 1,138,465 | A * | 5/1915 | Fegley | B23B 31/113 |
| | | | | 279/82 |
| 2,166,559 | A * | 7/1939 | Richard | B21D 28/34 |
| | | | | 279/30 |
| 2,580,930 | A * | 1/1952 | Kost | B21D 28/34 |
| | | | | 279/30 |
| 3,756,737 | A | 9/1973 | Smith | |
| 3,932,904 | A | 1/1976 | Nilsson et al. | |
| 4,413,937 | A | 11/1983 | Gutsche | |
| 4,629,375 | A | 12/1986 | Lieser | |
| 4,710,079 | A | 12/1987 | Smith et al. | |
| 5,284,069 | A * | 2/1994 | Wellman | B21D 28/34 |
| | | | | 279/30 |
| 5,722,805 | A | 3/1998 | Giffin | |
| 6,053,675 | A * | 4/2000 | Holland | B23B 31/1074 |
| | | | | 279/145 |
| 6,354,177 | B2 * | 3/2002 | Peters | B25B 15/001 |
| | | | | 81/177.4 |
| 6,860,489 | B2 * | 3/2005 | Chen | B23B 31/1173 |
| | | | | 279/82 |
| 6,929,266 | B2 * | 8/2005 | Peters | B25B 15/001 |
| | | | | 279/155 |
| 7,250,023 | B2 * | 7/2007 | Bai | B25B 23/00 |
| | | | | 279/14 |
| 9,156,147 | B2 * | 10/2015 | Peters | B23B 31/10 |
| 9,873,155 | B1 * | 1/2018 | Wienhold | B23B 31/1071 |
| 2007/0152408 | A1 * | 7/2007 | Peters | B23B 31/005 |
| | | | | 279/143 |
| 2015/0217434 | A1 * | 8/2015 | Funk | B23B 31/1071 |
| | | | | 279/82 |
| 2015/0336246 | A1 * | 11/2015 | Peters | B23B 31/107 |
| | | | | 81/439 |

OTHER PUBLICATIONS

U.S. Appl. No. 29/659,105, filed Aug. 6, 2018, Giffin.
International Search Report for International (PCT) Application No. PCT/US1996/19042, dated Jan. 31, 1997, 1 page.
U.S. Appl. No. 08/569,712, filed Dec. 8, 1995.
U.S. Appl. No. 29/659,104, filed Aug. 6, 2018.
U.S. Appl. No. 29/659,105, filed Aug. 6, 2018.

* cited by examiner

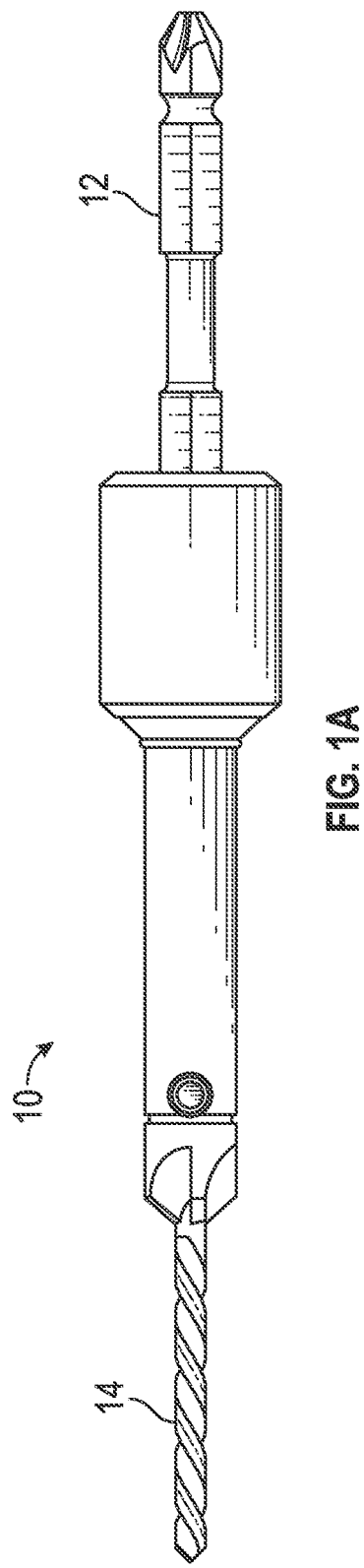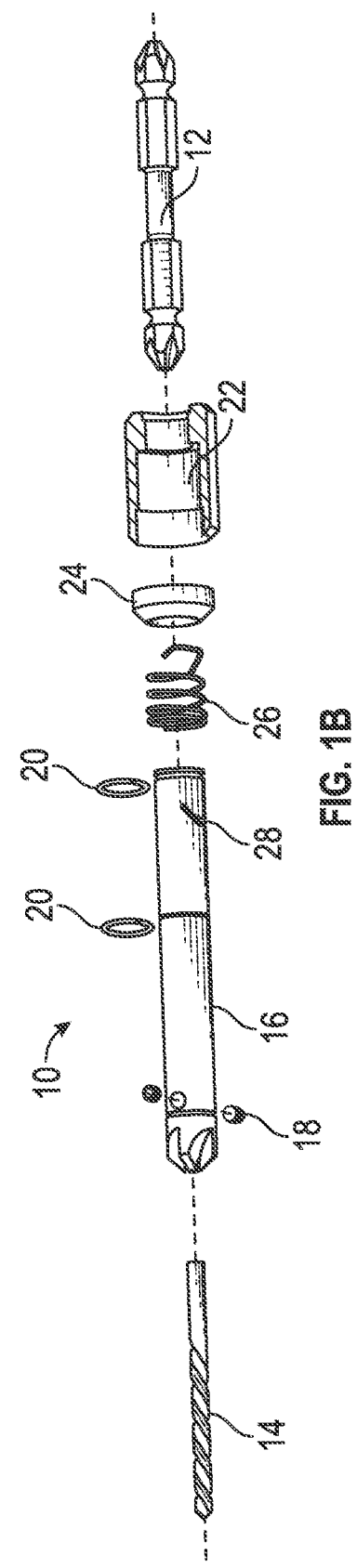
FIG. 1A
FIG. 1B

DRILL BIT ADAPTER TOOL

CROSS-REFERENCE TO RELATED APPLICATIONS

This application claims priority under 35 U.S.C. § 119(e) to U.S. Provisional Patent Application Ser. No. 62/482,088 filed Apr. 5, 2017, which is incorporated herein in its entirety by reference.

FIELD OF THE INVENTION

The present invention is generally directed to hand tools and more specifically to devices for mounting a drill bit on a hand tool that rotates or drives the drill bit.

BACKGROUND OF THE INVENTION

In many trades and other work situations, an operator must repeatedly exchange drill bits or replace drill bits with other tools, such as a driver or screw driver tip, while performing successive, repetitive operations using an electric drill. For example, construction workers or carpenters regularly change drill bits during numerous types of construction projects, often times when the worker is in a position where it is difficult to change the drill bit, such as on a ladder. To change a drill bit, the carpenter must loosen the chuck, remove the old bit from the chuck, insert the new bit and tighten the chuck. Drill bit changes typically require both hands, which can interrupt the carpenter's work, resulting in inconvenience and thereby increased costs due to the inefficient use of time required by the changing of drill bits. Tool changes are especially a problem when the carpenter is temporarily holding an object in place with one hand while attempting to switch drill bits with the other hand. An expensive alternative is to use multiple drills having different drill bits or tools attached to each.

Several devices have been developed to attempt to simplify the process for exchanging drill bits or replacing drill bits with other tools, such as a driver or screw driver tip. In one device, for example, the multiple prongs of an adaptor are inserted into the cavities in the drill chuck. Although the device does provide a simpler method for exchanging tools, the prongs can be difficult to align with the cavities. Through wear, the ability of the prongs to grip the chuck can decrease over time. As a result, the adaptor can wobble on the chuck during use and get stuck in the drilled hole during removal.

Another device for exchanging tools includes an adaptor having a drill bit at one end and a driver at the other end. A holder receives a selected one of each of these two ends. During the drilling operation, the drill bit is exposed and the driver is within the holder. After drilling and when it is desired to then utilize the driver, this adaptor is grasped and removed from the holder. The drill bit end is then inserted into the holder. However, such an adaptor is subject to heat build-up during such usage. This heat can cause discomfort or burn the operator's fingers upon reversing the ends of the adaptor. Additionally, such heat build-up can cause the adaptor to expand and become jammed in the holder. This is especially a problem when sawdust and other debris collects in the holder from the drill bit when it is placed in the holder. Furthermore, when the drill bit breaks off from the adaptor, unwanted complications occur in replacing the broken drill bit with a new drill bit.

Other prior art devices for exchanging tools include drill bits that have similar or the same drawbacks, particularly when performing back-and-forth drill and drive operations. That is, operations that involve alternating and repeated uses of the drill bit and the driver. For example, alternating the drilling of a hole using a drill bit and performing a fastening or other operation using a driver.

Further still, prior art devices for exchanging tools are primarily designed for wood working functions, meaning the drill bit bores out a hole in a portion of wood, and the driver drives a screw or bolt into the same hole. Prior art devices are not designed for impact drills, which also rotate drill bits and drivers, but add concussive action, which allows impact drills to operate with dense wood, cement, etc. Impact drills can have a standard three jaw drill chuck or, more commonly, a ball detent style chuck to hold ¼" hexagonal tools built with the necessary detent groove. As a result, impact drills often overpower and destroy prior art exchanging tools.

SUMMARY OF THE INVENTION

The above needs and other needs are addressed by the various embodiments and configurations of the present invention. It is an objective of the present invention to provide an adaptor tool that can be conveniently and rapidly engaged with a driver to facilitate back-and-forth drill and drive operations. Related objectives include providing a low cost, less complex adaptor tool, an adaptor tool that will not dislodge from the driver or become jammed in the driver during use, and an adaptor tool that will not become difficult to handle due to heat buildup during use.

It is an aspect of embodiments of the present invention to provide an adapter tool that comprises a spring with an engagement end that selectively engages and disengages from a recess of a driver. The body of the adapter may comprise a slot that extends through the body and into the interior volume that receives the driver, and the engagement end is positioned in the slot. In an engaged state, the engagement end of the spring at least partially extends into the interior volume in the adapter and into a recess in the driver to secure the adapter to the driver. In a disengaged state, the engagement end of the spring moves away from the recess in the driver, which allows for the release of the driver. This aspect provides a strong selective connection between the adapter tool and the driver that is rated for impact drills but also provides an easy release of the driver.

It is a further aspect of embodiments of the present invention to provide a retractable cap on the adapter tool that actuates the spring and the engagement end of the spring between the engaged state and the disengaged state. The retractable cap is movable along a longitudinal length of the adapter tool between a first position and a second position. When the retractable cap moves into the second position, the retractable cap compresses the spring such that the engagement end of the spring retracts from the recess of the driver and the interior volume of the adapter that houses the driver, which allows for the release of the driver. When a user releases the retractable cap, the spring forces the retractable cap back into the first position, and the engagement end of the spring extends back into the recess of the driver and the interior volume of the adapter that receives the driver.

It is another aspect of embodiments of the present invention to provide a holster that can secure adapter tools and selectively release a driver from an adapter tool. The holster can comprise receivers and/or retainers to secure an adapter tool to the holster. In addition, the holster may comprise a cap bar configured to deflect a retractable cap on the adapter tool. Therefore, a user can have an adapter engaged to a driver, and then selectively connect the adapter to the holster. Next, the user can pull upward on the driver such that the adapter moves longitudinally toward the cap bar. The cap bar is configured to deflect the retractable cap, which causes the engagement end of the spring to release the driver. Thus, the user continues to pull upward on the driver to release the driver from the adapter, and the adapter remains selectively connected to the holster.

Furthermore, the holster can allow for the selective connection between an adapter tool and a driver. To begin, the adapter tool is positioned in the receiver and retainer of the holster. A user can push the driver into an interior volume of the adapter tool, and a distal end of the driver pushes a spring away from a longitudinal axis of the body. The driver continues to push into the interior volume until a recess of the driver allows the spring to extend back toward the longitudinal axis and selectively connect the adapter tool and the driver. Next, a user can rotate the combined driver and adapter tool out of the retainer and then pull the combined driver and adapter tool out of the receiver to complete the process and use a tool such as a drill bit on the end of the adapter tool.

One particular embodiment of the present invention is an adapter tool for selectively engaging and releasing a second tool, comprising a body having a first end, an opposing second end, a longitudinal axis, and an inner surface that defines an interior volume configured to receive a second tool; a slot that extends from a first point at an outer surface of the body to a second point at the inner surface, wherein a distance from the first point to the first end is larger than a distance from the second point to the first end; a spring positioned about the outer surface of the body, the spring having an engagement end configured to be positioned at least partially within the slot; and a retractable cap positioned about the outer surface proximate to the first end of the body and translatable along the longitudinal axis of the body between a first position and a second position, wherein, in the first position, the engagement end of the spring extends at least partially into the interior volume to engage the second tool, and wherein, in the second position, the retractable cap deflects the engagement end of the spring in the slot to move the engagement end away from the interior volume and to disengage the second tool.

In some embodiments, at least half of a cross-sectional area of the engagement end of the spring is configured to be positioned in a recess volume of the second tool when the retractable cap is in the first position. In various embodiments, at least a portion of the cross-sectional area of the engagement end of the spring is configured to be positioned outside of the recess volume of the second tool when the retractable cap is in the first position. In some embodiments, in the second position, the retractable cap deflects the engagement end of the spring into a portion of the second tool that defines the recess volume to move the engagement end away from the interior volume and to disengage the second tool.

In various embodiments, the retractable cap has an inner surface that defines an inner cavity, and the spring is at least partially positioned in the inner cavity such that the engagement end of the spring contacts a portion of the inner surface of the retractable cap. In some embodiments, the adapter tool further comprises a bushing positioned about the outer surface of the body, wherein the inner surface of the retractable cap is at least partially positioned about an outer surface of the bushing. In various embodiments, the slot forms an angle with the longitudinal axis to translate longitudinal movement of the retractable cap to lateral movement of the engagement end of the spring, and the angle is between approximately 25 and 35 degrees.

Another particular embodiment of the present invention is a combined drill and driver system, comprising an adapter tool having: a body having a longitudinal axis and an aperture forming an angle with respect to the longitudinal axis, wherein the angled aperture extends from an outer surface to an inner surface of the body, and the inner surface defines a partially enclosed volume; a retractable cap disposed around the outer surface of the body and having an inner surface defining an inner cavity; a spring disposed around the outer surface of the body and at least partially positioned in the inner cavity, the spring having an engagement end at least partially positioned in the angled aperture of the body; a second tool removably interconnected and positioned in the partially enclosed volume, a second tool including a recess on a forward end, wherein the retractable cap is configured to move the engagement end of the spring into the recess of the second tool to retain the second tool to the adapter tool until the retractable cap is moved downward and away from the second tool to release the second tool from the adapter tool.

In various embodiments, the angle of the aperture is between approximately 25 and 35 degrees. In some embodiments, the recess of the second tool has a radiused cross-sectional shape. In various embodiments, the retractable cap has a first inner diameter and a second inner diameter, wherein the first inner diameter is substantially the same as an outer diameter of a bushing of the adapter tool and the second inner diameter is smaller than the first inner diameter to limit longitudinal travel of the retractable cap relative to the bushing. In some embodiments, in the first distance from the longitudinal axis, at least half a cross-sectional area of the engagement end of the spring is positioned within the recess volume of the second tool. In various embodiments, in the first distance from the longitudinal axis, at least a portion of the cross-sectional area of the engagement end of the spring is positioned outside of the recess volume of the second tool.

Yet another particular embodiment of the present invention is a holster adapted for selectively holding and releasing a tool, comprising a substantially planar body having an upper end, a lower end, and two sidewalls extending therebetween, the body having a front surface and a rear surface; a cap bar positioned proximate to the upper end and extending outwardly from the front surface of the body, the cap bar having an engagement surface; a pocket positioned below the cap bar, the pocket having a receiver adapted to receive a lower end of a tool; and a U-shaped retainer positioned between the cap bar and the receiver of the pocket, the U-shaped retainer adapted to secure a mid-portion of the tool, wherein the pocket and the U-shaped retainer are configured to removably secure an upper portion of the tool proximate to the engagement surface of the cap bar.

In some embodiments, the cap bar has at least one recess that has an inner diameter, wherein the inner diameter of the recess is larger than an outer diameter of a body of the tool and smaller than an outer diameter of a retractable cap of the tool. In various embodiments, the holster further comprises at least one arm extending from the rear surface and substantially parallel to the body, wherein the at least one arm is configured to selectively interconnect to a belt. In some embodiments, the pocket is configured to receive a drill bit of the tool.

In various embodiments, the U-shaped retainer has two arms that define an inner diameter that is substantially the same as an outer diameter of a body of a tool. In some embodiments, a distance between two ends of the arms is less than an outer diameter of the body of the tool such that the body is configured to deflect at least one of the arms to be positioned in the inner diameter defined by the two arms. In various embodiments, the holster further comprises a second pocket and a second U-shaped retainer, wherein a distance between the second pocket and the second U-shaped retainer is larger than a distance between the pocket and the U-shaped retainer.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements or components. Additional aspects of the present invention will become more readily apparent from the Detailed Description, particularly when taken together with the drawings.

The above-described embodiments, objectives, and configurations are neither complete nor exhaustive. As will be appreciated, other embodiments of the invention are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

BRIEF DESCRIPTION OF THE DRAWINGS

The accompanying drawings, which are incorporated in and constitute a part of the specification, illustrate embodiments of the invention and together with the Summary of the Invention given above and the Detailed Description of the drawings given below, serve to explain the principles of these embodiments. In certain instances, details that are not necessary for an understanding of the invention or that render other details difficult to perceive may have been omitted. It should be understood, of course, that the invention is not necessarily limited to the particular embodiments illustrated herein. Additionally, it should be understood that the drawings are not necessarily to scale.

FIG. 1A is a side view of an adapter tool in accordance with one embodiment of the present invention;

FIG. 1B is an exploded, side view of the adapter tool in FIG. 1 in accordance with one embodiment of the present invention;

Figure 2:
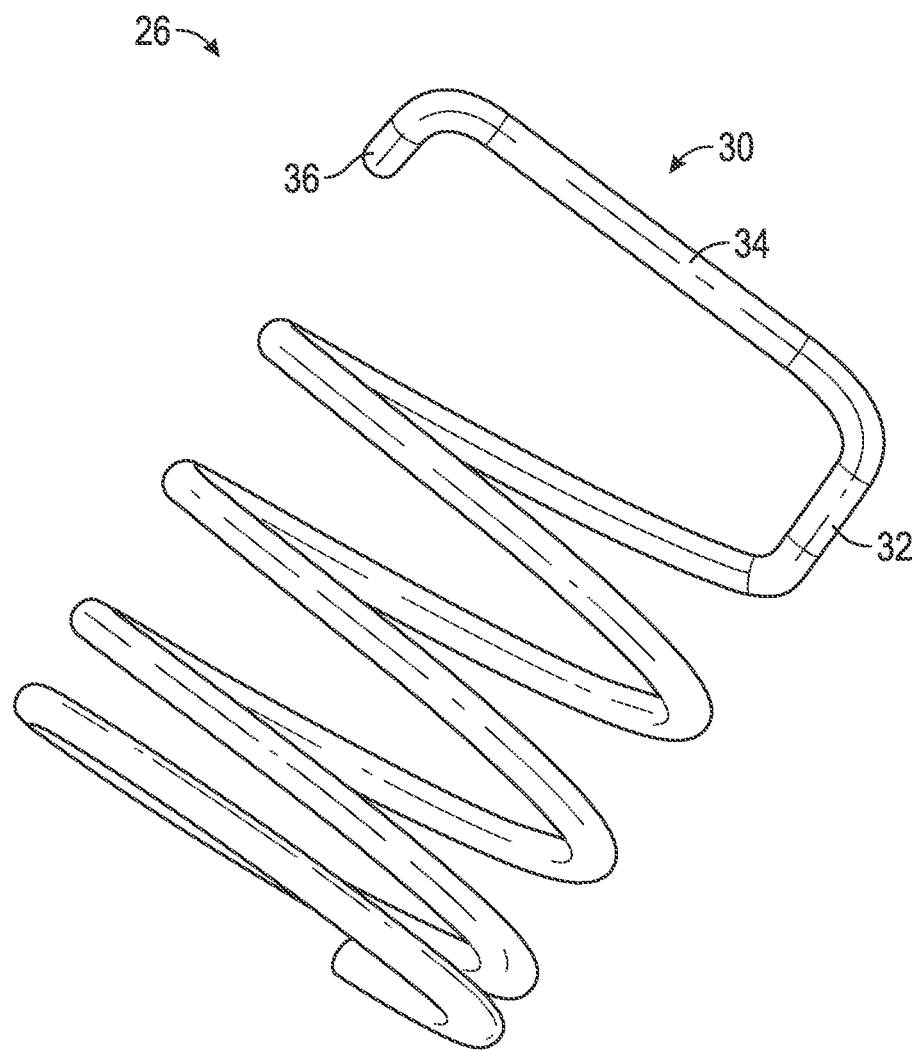
FIG. 2 is a perspective view of a spring in accordance with one embodiment of the present invention.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

A list of the various components shown in the drawings and associated numbering is provided herein:

| Number | Component |
| --- | --- |
| 10 | Adapter Tool |
| 12 | Driver |
| 14 | Drill Bit |
| 16 | Body |
| 18 | Screw |
| 20 | Ring |
| 22 | Retractable Cap |
| 24 | Bushing |
| 26 | Spring |
| 28 | Slot |
| 30 | Engagement End |
| 32 | First Segment |
| 34 | Second Segment |
| 36 | Third Segment |
| 38 | Recess |
| 40 | Inner Surface |
| 42 | Inner Cavity |
| 44 | Slot Angle |
| 46 | Longitudinal Axis |
| 48 | Inner Surface |
| 50 | Interior Volume |
| 52 | Holster |
| 54 | Cap Outer Diameter |
| 56 | Cap Inner Diameter/Body Outer Diameter |

| Number | Component |
|---|---|
| 58 | Receiver |
| 60 | Retainer |
| 62 | Arms |
| 64 | Cap Bar |
| 66 | Recess |
| 68 | Recess Inner Diameter |

DETAILED DESCRIPTION

The present invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, may be modified in numerous ways within the scope and spirit of the invention.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Various embodiments of the present invention are described herein and as depicted in the drawings. It is expressly understood that although the figures depict adapter tools, and methods and systems for using the same, the present invention is not limited to these embodiments.

Referring to FIGS. 1A and 1B, an assembled perspective view and an exploded perspective view of an adapter tool 10 selectively connected to a driver 12 are provided, respectively. The adapter tool 10 has a first end configured to selectively receive a drill bit 14, and the adapter tool 10 has a second end configured to selectively receive the driver 12. Thus, for example, a user can operate the drill bit 14, selectively remove the drill bit 14 and adapter tool 10 from the driver 12, and then operate the driver 12. It will be appreciated that a drill bit can come in several different sizes including, but not limited to, 7/64", 1/8", and 9/64". It will be further appreciated that the adapter tool 10 can have additional features such as a countersink bit, a flat edge to prevent the unintended rotation of the adapter tool 10, etc.

Further referring to FIG. 1B, an exploded view of an adapter tool 10 and related components is provided. The base of the drill bit 14 extends into the body 16 of the adapter tool 10, and a pair of screws 18 secure the drill bit 14 in the body 16. It will be appreciated that other forms of selective connection can be utilized to secure the drill bit 14 to the body 16 including, but not limited to, a chuck system, a lug system, etc. It will be further appreciated that not only drill bits can be mounted on the end of the adapter tool 10, for example, other tools such as screw heads can also be mounted to the adapter tool 10.

Next, two rings 20 are positioned on the body 16 of the adapter tool 10 to limit the components of the adapter tool 10 that selectively connect to the driver 12. In the depicted embodiment, a retractable cap 22, a bushing 24, and a spring 26 selectively connect the adapter tool 10 to the driver 12. The bushing 24 abuts the distal ring 20, and one end of the spring 26 engages the inner surface of the bushing 24. The retractable cap 22 engages the other end of the spring 26 and at least partially encloses the spring 26 and bushing 24, and then the proximal ring 20 secures the retractable cap 22. Thus, the distal ring 20 limits distal movement of the bushing 24, and the proximal ring 20 limits proximal movement of the retractable cap 22. As described in further detail below, a portion of the spring 26 extends into a slot 28 in the body 16 of the adapter tool 10 to selectively engage the driver 12. Generally, a user can move the retractable cap 22 longitudinally along the body 16 between the rings 20 from a first position to a second position, which causes the spring 26 to selectively engage and disengage the driver 12.

Now referring to FIG. 2, a detailed, perspective view of the spring 26 is provided. The end that contacts the bushing is coiled, and the opposing engagement end 30 that contacts the retractable cap and extends into the slot of the body of the adapter tool has several segments. A first segment 32 reorients the spring 26 from the coiled helical pattern. Next, a segment 34 extends laterally across the spring 26, and this segment 34 extends into the slot of the body of the adapter tool and engages the driver. Finally, a third segment 36 extends perpendicular from the second segment 34, and the third segment 36 contacts an outer surface of the body of the adapter tool to maintain the position and orientation of the spring 26. These segments are depicted as straight segments joined at predetermined angles. For example, the first segment 32 may be joined to the second segment 34 at an angle between approximately 90 and 86 degrees, or approximately 87.5 degrees. This configuration places the second segment 34 in pretension relative to the first segment 32 and the coiled portion of the spring 26 such that the second segment 34 sits evenly in a slot in the adapter tool. However, it will be appreciated that these segments may be curved in some embodiments. It will be further appreciated that not every embodiment of the invention may have three segments and that some embodiments may have more or fewer segments. For example, in some embodiments only one segment may deviate from the helical pattern to extend across the slot of the body of the adapter tool.

Figure 3:
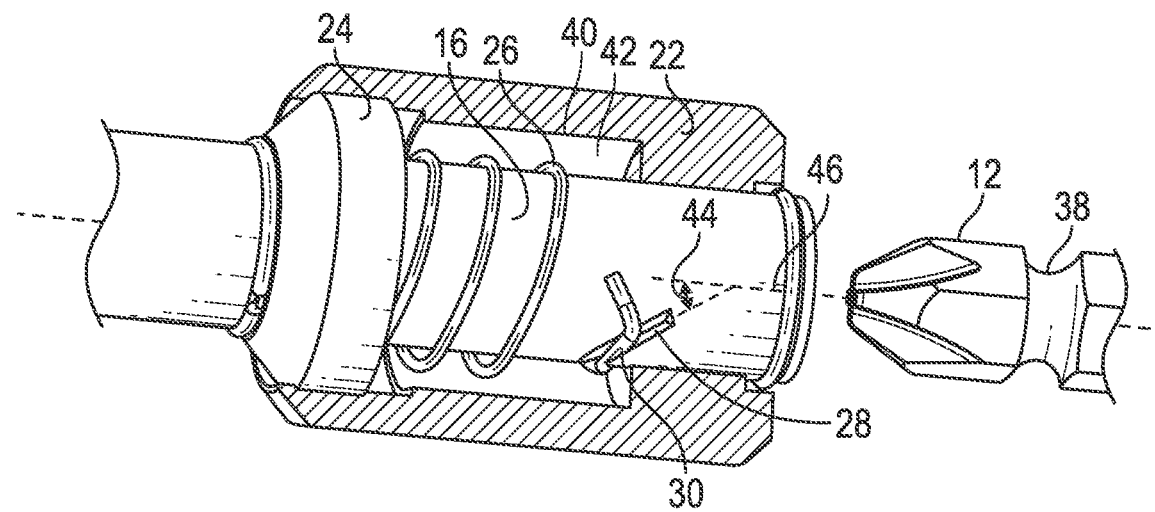
FIG. 3 is a partial, cross-sectional view of an adapter tool with a retractable cap in a retracted position in accordance with one embodiment of the present invention.

Now referring to FIG. 3, a partial cross-sectional view of an assembled adapter tool is provided. A driver 12 with a recess 38 is positioned outside of an interior volume defined by an inner surface of the body 16. A spring 26 is disposed about an outer surface of the body 16 and disposed in a cavity 42 defined by an inner surface 40 of the retractable cap 22. The retractable cap 22 of the adapter tool is in a retracted position relative to the bushing 24 such that an inner surface 40 of the retractable cap 22 drives the engagement end 30 of the spring 26 in the slot 28. The slot 28 has a slot angle 44 relative to a longitudinal axis 46 of the body 16. Therefore, as the retractable cap 22 moves toward the bushing 24, the engagement end 30 of the spring 26 moves outward from the longitudinal axis 46. As a result, the engagement end 30 is moved partially or completely out of the interior volume to allow the driver 12 to enter the interior volume. Alternatively, a distal end of the driver 12 can push the spring 26 against the slot 28 and away from the longitudinal axis 46.

The slot 28 begins at a first point on an outer surface of the body 16 and extends to a second point on an inner surface of the body 16. The distance between the first point and the end of the body 16 that receives the driver 12 is larger than the distance between the second point and the end of the body 16 that receives the driver 12. Thus, the slot 28 forms an angle with the longitudinal axis 46 of the body 16. It will be appreciated that in some embodiments the slot angle 40 is between approximately 20 and 40 degrees. In some embodiments, the slot angle 40 is between approximately 25 and 35 degrees. In various embodiments, the slot angle 40 is approximately 30 degrees. In addition, since the spring 26 is compressed when the retractable cap 22 is retracted, the spring biases the retractable cap 22 toward an unretracted position.

Figure 4:
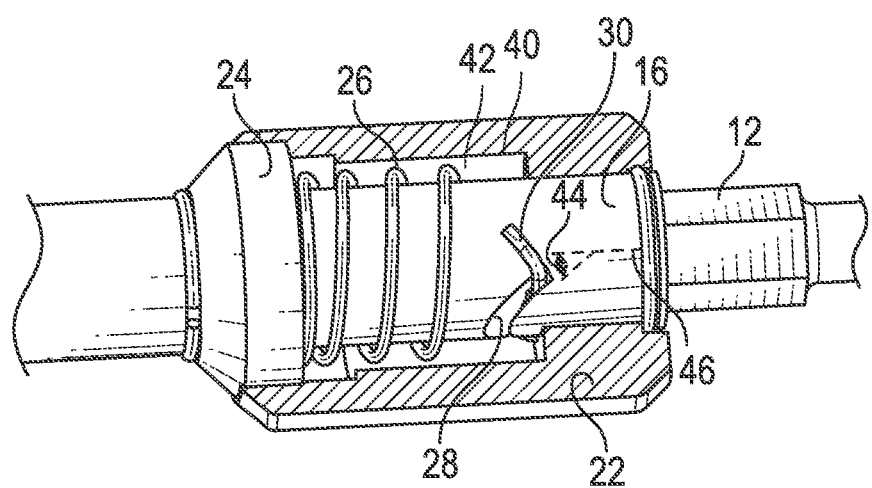
FIG. 4 is a partial cross-sectional view of the adapter tool in FIG. 3 with a retractable cap in an unretracted position in accordance with one embodiment of the present invention.

Now referring to FIG. 4, a partial cross-sectional view of an assembled adapter tool is provided. Now the driver 12 is positioned within the interior volume defined by an inner surface of the body 16. The retractable cap 22 is in an unretracted position relative to the bushing 24. Thus, the engagement end 30 of the spring 26 is allowed to uncompress and extend further into the slot 28. The spring 26 extends closer to the longitudinal axis of the body 16 due to the slot angle 40. As a result, the engagement end 30 of the spring 26 extends into the interior volume of the body 16 and into the recess 38 of the driver 12. In some embodiments, the engagement end 30 extends only partially into the interior volume. In other embodiments, a portion of the engagement end 30 extends completely into the interior volume.

To disengage the adapter tool from the driver 12, a user can move the retractable cap 22 along the body of the adapter tool in a longitudinal direction toward the bushing 24 This motion compresses the spring 26 and causes the engagement end 30 of the spring 26 to move so that the engagement end 30 of the spring 26 no longer engages the recess 38 of the driver 12. Then, the user can remove the adapter tool and use the driver 12.

Figure 5:
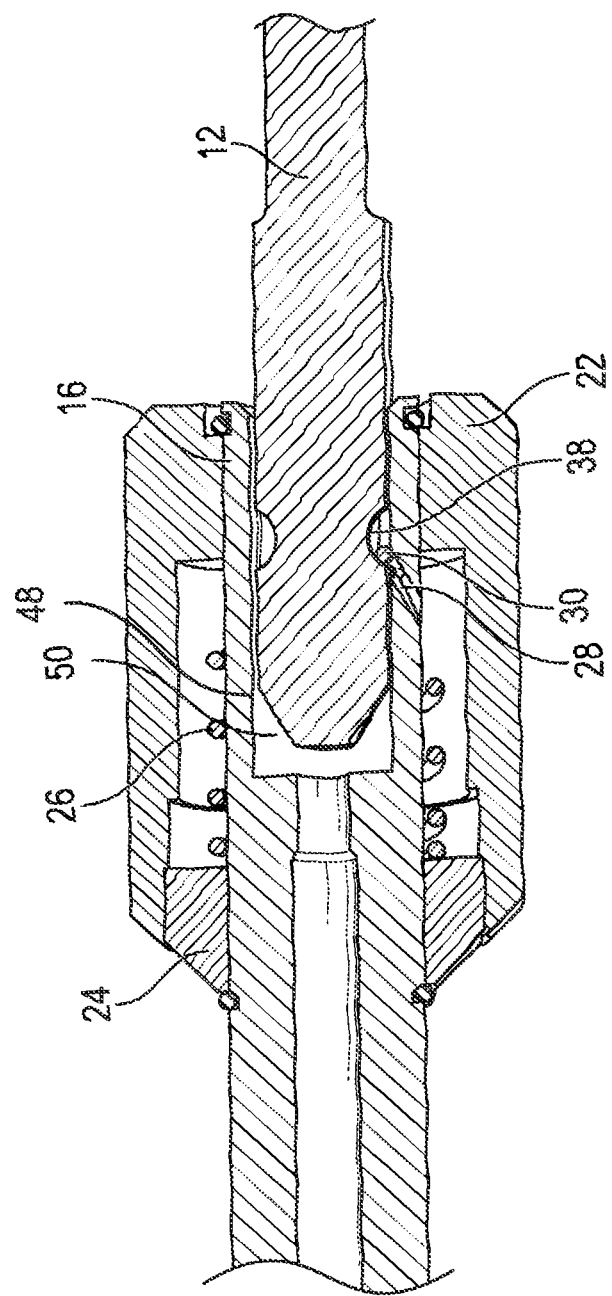
FIG. 5 is a cross-sectional view of the adapter tool in FIG. 4 in accordance with one embodiment of the present invention.

Now referring to FIG. 5, a cross-sectional view of the adapter tool in FIG. 4 is provided. An interior volume 50 of the body is defined by an inner surface 48 of the body. As shown, the engagement end 30 of the spring 26 extends through the slot 28 in the body 16 of the adapter tool to hold the driver 12 in place. Specifically, the driver 12 has a recess 38 that the engagement end 30 of the spring 26 extends into to prevent longitudinal movement between the adapter tool and the driver 12. To prevent rotational movement and to transmit power between the adapter tool and the driver 12, in this embodiment, the interior volume 50 in the body has a hexagonal shape that is configured to receive a hexagonal shape of the driver 12. It will be appreciated that in other embodiments, other polygonal shapes can be used or, for example, a protrusion/recess combination can be used to prevent rotational movement between the adapter tool and the driver 12.

Figure 6A:
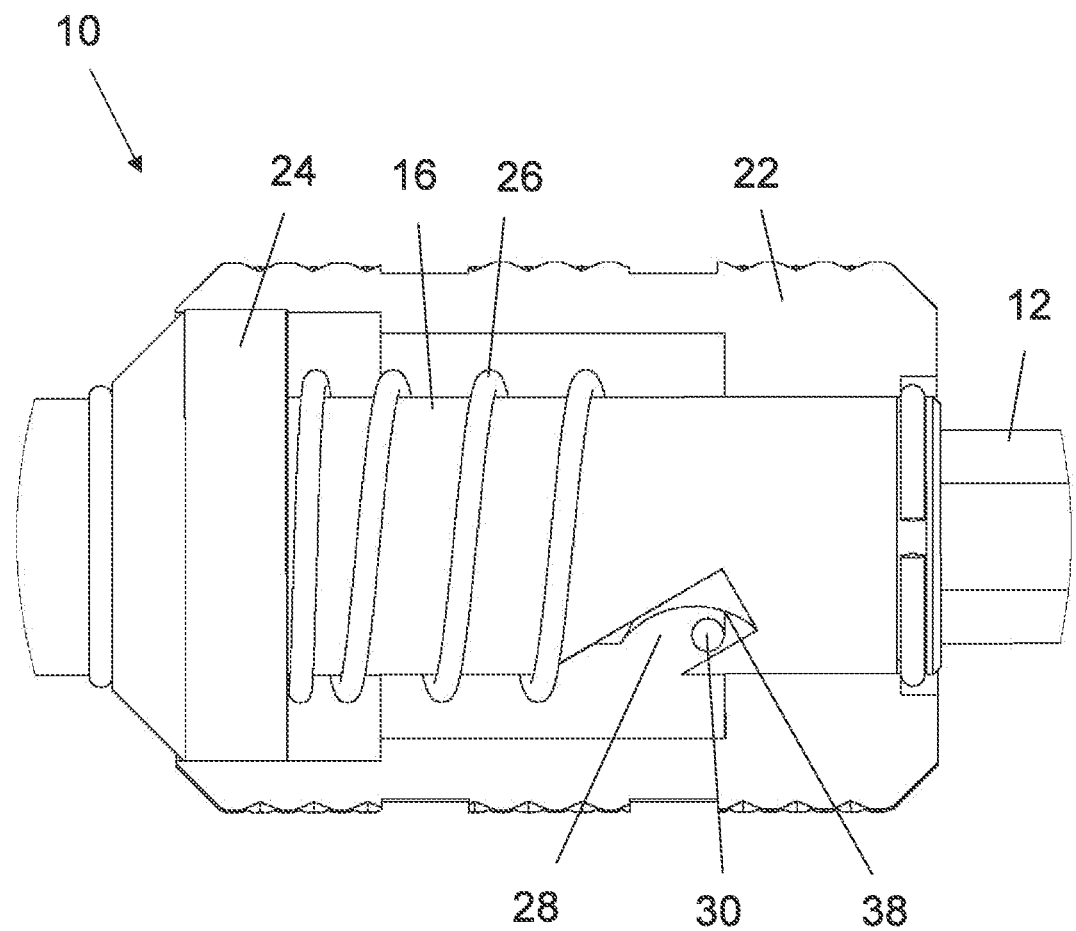
FIG. 6A is a partial cross-sectional view of an adapter tool with a spring in a relaxed state in accordance with one embodiment of the present invention.
Figure 6B:
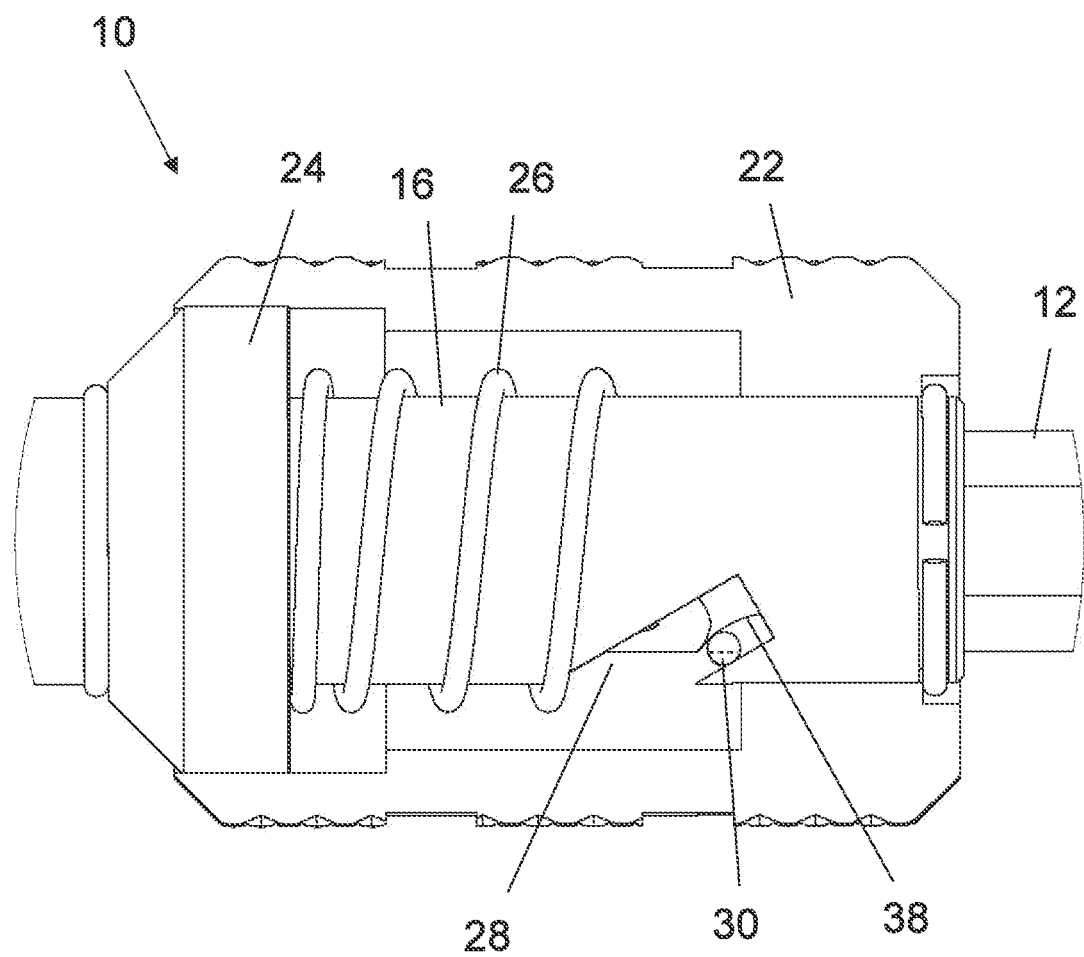
FIG. 6B is a partial cross-sectional view of the adapter tool in FIG. 6A with the spring in a locked state in accordance with one embodiment of the present invention.
Figure 6C:
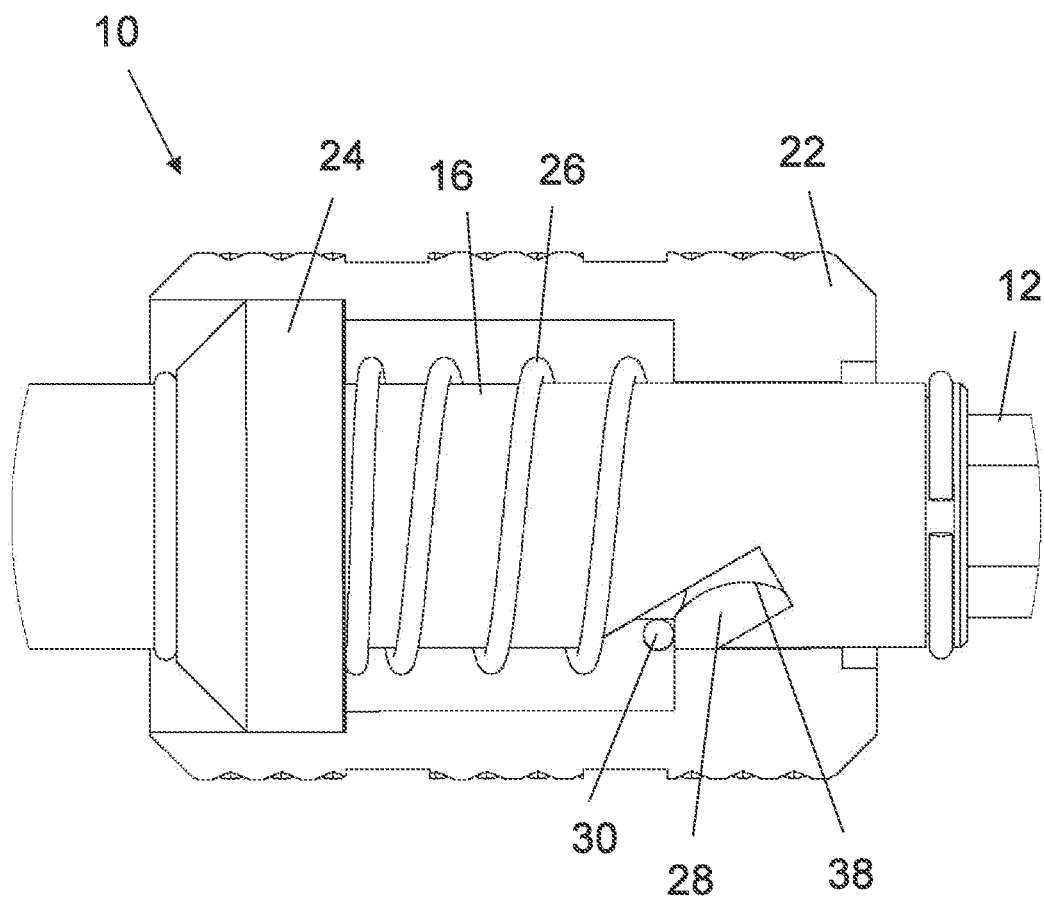
FIG. 6C is a partial cross-sectional view of the adapter tool in FIG. 6A with the spring in a released state in accordance with one embodiment of the present invention.

Now referring to FIGS. 6A-6C, partial cross-sectional views of the slot 28 and engagement end 30 are provided. These figures show the spatial relationship among various components of the adapter tool 10 and driver 12 to provide the selective engagement between the adapter tool 10 and driver 12. In FIG. 6A, the spring 26 biases the retractable cap 22, and the engagement end of the spring 26 extends into the slot 28 and into a volume defined by the recess 38 of the driver 12. There is no relative movement between the adapter tool 10 and the driver 12, and therefore, the engagement end 30 resides in the volume defined by the recess 38.

In FIG. 6B, there is longitudinal movement between the adapter tool 10 and the driver 12. This longitudinal movement can be generated by, for example, a user removing the drill bit and/or counter sink positioned on the distal end of the adapter tool 10 from a pilot hole. In effect, this pulls the adapter tool 10 from the driver 12. Therefore, the engagement end 30 of the spring 26 is brought into contact with a surface of the driver 12 that defines the recess 38. The engagement end 30 is wedged between the slot 28 of the body 16 and the surface of the driver 12, and the adapter tool 10 remains locked and selectively engaged with the driver 12. To achieve this effect, in some embodiments, more than 50% of a cross-sectional area of the engagement end 30 is positioned in the volume defined by the recess 38 of the driver 12. In FIG. 6B a dashed line on the engagement end 30 shows which portion of the cross-sectional area of the engagement end 30 is positioned in the volume defined by the recess 38. In various embodiments, between approximately 50% and 80% of a cross-sectional area of the engagement end 30 is positioned in the volume. In some embodiments, between 51% and 60% of a cross-sectional area of the engagement end 30 is positioned in the volume.

In addition, to achieve a quick and easy release of the driver 12 from the adapter tool 10, at least a portion of a cross-sectional area of the engagement end 30 is positioned outside of the volume defined by the recess 38 of the driver 12. To release the driver 12, in some embodiments, the retractable cap 22 moves approximately 2 mm along a longitudinal axis of the body 16. Thus, the inner surface of the retractable cap 22 pushes the engagement end 30 of the spring 26 against the surface of the driver 12 that defines the recess 38. In this embodiment, the surface of the driver is radiused and therefore transfers lateral movement of the spring 26 into movement away from the recess 38. This provides a quick and easy release of the driver 12.

In FIG. 6C, retractable cap 22 is retracted towards the bushing 24 to compress the spring 26 and deflect the engagement end 30 out of the volume defined by the recess 38 of the driver 12. With the engagement end 30 in this position, a user can remove the adapter tool 10 from the driver 12.

Figure 7:
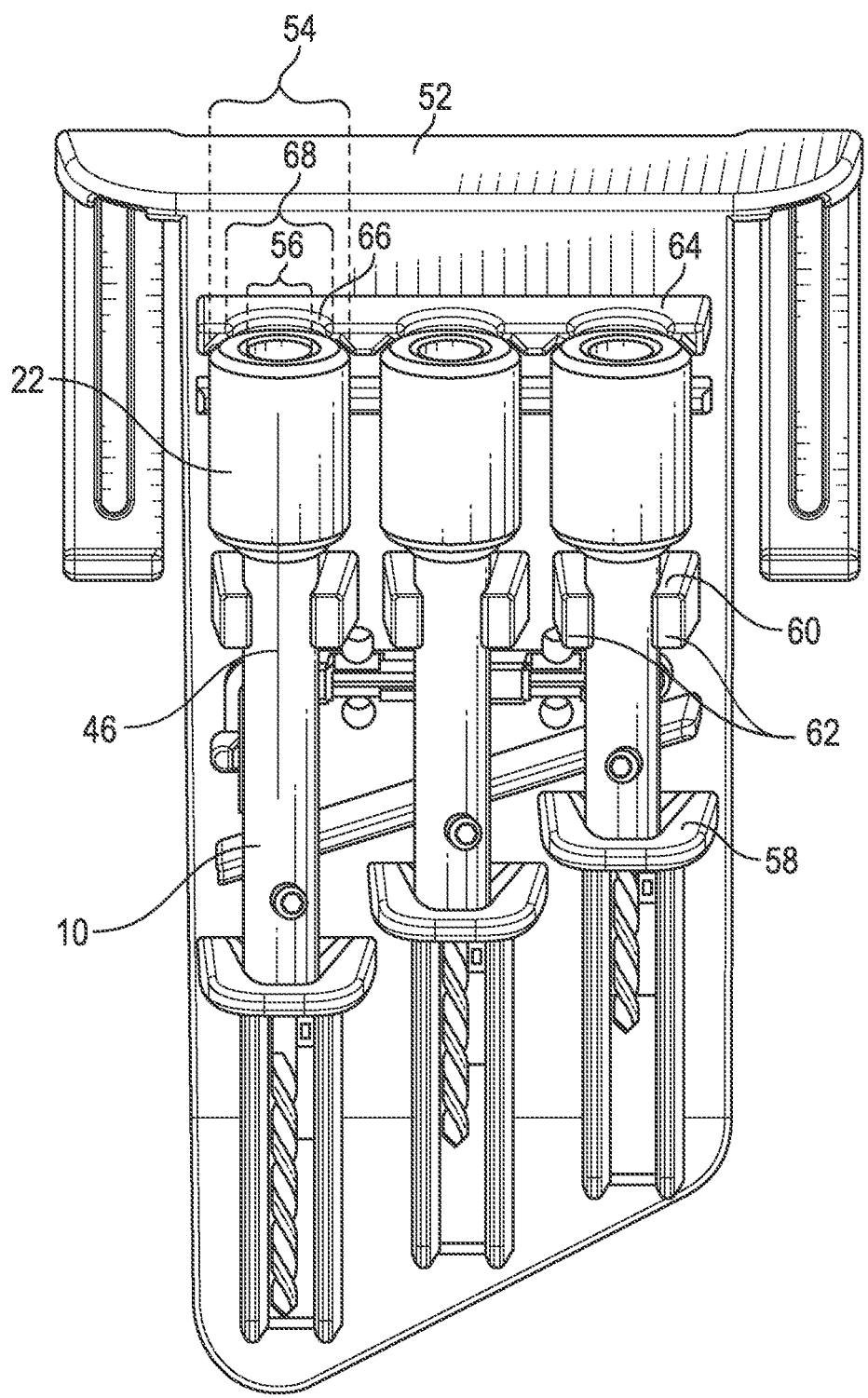
FIG. 7 is a perspective view of a tool holster and adapter tool system in accordance with one embodiment of the present invention.

Now referring to FIG. 7, a perspective view of an adapter tool 10 and a holster 52 is provided. The holster 52 can hold a plurality of adapter tools 10. In this embodiment, the adapter tools 10 have different-sized drill bits positioned at distal ends of the adapter tools 10. Therefore, a user can quickly and selectively engage different adapter tools 10 and drill bits to the same driver to drill and drive various sized, for example, screws or bolts. The holster 52 has a receiver 58 for each adapter tool 10 where the receiver 58 defines an aperture through which a distal end of the adapter tool 10 passes through to secure the adapter tool 10 relative to the holster 52. The holster 52 also has a retainer 60 where the retainer 60 has two arms 62 that define an inner diameter that is substantially the same as the outer diameter 56 of the body of the adapter tool 10. However, the ends of the two arms 62 are separated by a distance that is less than the outer diameter 56 of the body of the adapter tool 10. Therefore, the adapter tool 10 can deflect one or more arms 62 to snap into the inner diameter of the retainer 60 to further secure the adapter tool 10 to the holster 52. It will be appreciated that in some embodiments, the holster 52 may have only one of a receiver 58 or a retainer 60. Further, in some embodiments, the holster 52 may have, for example, two retainers 60.

To place the adapter tool 10 in the holster 52, a user may first orient the adapter tool 10 and the holster 52 at an angle relative to each other. Then, the user inserts the distal end of the adapter tool 10 into the receiver 58 of the holster 52, then the user can rotate the adapter tool 10 and the holster 52 to a parallel orientation relative to each other. During rotation, the adapter tool 10 deflects the arms 62 of the retainer 60 and snaps into the inner diameter of the retainer 60. The receiver 58 and the retainer 60 secure the adapter tool 10 to the holster 52, but can also allow movement of the adapter tool 10 relative to the holster 52 along a longitudinal axis 46 of the adapter tool 10.

The holster 52 can also comprise a cap bar 64 which can quickly release a driver from the adapter tool 10 while the adapter tool 10 is secured in the holster 52. The cap bar 64 extends laterally from the holster 52 and is positioned proximate to the retractable cap 22 of the adapter tool 10. As depicted, the retractable cap 22 of the adapter tool 10 has an outer diameter 54 and an inner diameter 56, and the inner diameter 56 is substantially the same as an outer diameter of the body of the adapter tool 10. The cap bar 64 has a recess 66 that is proximate to the retractable cap 22 of the adapter tool 10, and the recess 66 has an inner diameter 68. The inner diameter 68 of the recess 66 is greater than the inner diameter 56 of the retractable cap 22 but less than the outer diameter 54 of the retractable cap 22. Therefore, if the adapter tool 10 moves longitudinally toward the cap bar 64, then the cap bar 64 surrounding the recess 66 will deflect the retractable cap 22 longitudinally relative to the body of the adapter tool 10.

In one exemplary use of the cap bar 64, a user has the adapter tool 10 equipped on a driver of a drill such that the spring in the adapter tool 10 is engaged with a recess of the driver, and the retractable cap 22 is in an unretracted position. The user, as described above, can angle the distal end of the adapter tool 10 into the receiver 58 of the holster 52, and rotate the adapter tool 10 into the retainer 60 to snap the adapter tool 10 into the inner diameter of the retainer 60 and secure the adapter tool 10 to the holster 52. Then, a user can move the drill and driver upward such that the adapter tool 10 moves longitudinally toward the cap bar 64. The cap bar 64 deflects the retractable cap 22 longitudinally along the body of the adapter tool 10 such that the spring of the adapter tool 10 moves out of engagement with the recess of the driver. The user continues to move the drill and driver upward, and the driver and the adapter tool release from each other, which allows the user to engage the driver with a screw or bolt or equip a new adapter tool.

It will be appreciated that this aspect of the holster 52 is not limited to the embodiment described herein. For example, the geometry of the cap bar 64, the retractable cap 22 and the body of the adapter tool 10 can be described in alternative terms as the invention is not limited to circular inner and outer diameters. Viewing the adapter tool 10 along the longitudinal axis, the cross section of the retractable cap 22 is disposed about a cross section of the body. The cap bar 64 can be positioned or shaped to obstruct only the cross section of the retractable cap 22 but not the cross section of the body. Thus, the cap bar 64 can comprise an edge, surface, or one or more tabs to deflect the retractable cap 22.

The holster 52 can also be used to selectively connect an adapter tool 10 with a driver. Starting with the adapter tool 10 positioned in the receiver 58 and the retainer 60 of the holster 52 as shown in FIG. 7, a user can press a driver into the interior volume of the adapter 10. A distal end of the driver deflects a spring against a slot to move the spring away from the longitudinal axis 46 of the body 10. The driver continues to extend into the interior volume until a recess of the driver is positioned proximate to the spring, which allows the spring to extend back down the slot and toward the longitudinal axis 46. When at least a portion of the spring is positioned in a volume defined by the recess of the driver, then the driver is selectively connected to the adapter tool 10. Next, a user can rotate the combined driver and adapter tool 10 out of the retainer 60 and then pull the combined driver and adapter tool 10 out of the receiver 58 to begin using the tool on the distal end of the adapter tool 10, such as a drill bit. Additional depictions of the holster 52 can be found in an Appendix, which is incorporated herein in its entirety by reference.

The description of the present invention has been presented for purposes of illustration and description, but is not intended to be exhaustive or limiting of the invention to the form disclosed. Many modifications and variations will be apparent to those of ordinary skill in the art. The embodiments described and shown in the figures were chosen and described in order to best explain the principles of the invention, the practical application, and to enable those of ordinary skill in the art to understand the invention.

While various embodiments of the present invention have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. It is to be expressly understood that such modifications and alterations are within the scope and spirit of the present invention, as set forth in the following claims.

What is claimed is:

1. An adapter tool for selectively engaging and releasing a second tool, comprising:
   a body having a first end, an opposing second end, a longitudinal axis, and an inner surface that defines an interior volume configured to receive a second tool, wherein the body has a rounded outer surface proximate to said second end;
   a countersink cutter positioned at said second end of said body;
   a slot that extends from a first point at an outer surface of said body to a second point at said inner surface, wherein said slot forms an angle with said longitudinal axis;
   a spring positioned about said outer surface of said body, said spring having an engagement end configured to be positioned at least partially within said slot; and
   a retractable sleeve positioned about said outer surface proximate to said first end of said body and translatable along said longitudinal axis of said body between a first position and a second position, wherein, in said first position, said engagement end of said spring extends at least partially into said interior volume to engage said second tool, and wherein, in said second position, said retractable sleeve deflects said engagement end of said spring in said slot to move said engagement end away from said interior volume and to disengage said second tool.

2. The adapter tool of claim 1, wherein at least half of a cross-sectional area of said engagement end of said spring is configured to be positioned in a recess volume of said second tool when said retractable sleeve is in said first position.

3. The adapter tool of claim 2, wherein at least a portion of said cross-sectional area of said engagement end of said spring is configured to be positioned outside of said recess volume of said second tool when said retractable sleeve is in said first position.

4. The adapter tool of claim 1, wherein, in said second position, said retractable sleeve deflects said engagement end of said spring into a portion of said second tool that defines said recess volume to move said engagement end away from said interior volume and to disengage said second tool.

5. The adapter tool of claim 1, wherein said retractable sleeve has an inner surface that defines an inner cavity, and said spring is at least partially positioned in said inner cavity such that said engagement end of said spring contacts a portion of said inner surface of said retractable sleeve.

6. The adapter tool of claim 5, further comprising a bushing positioned about said outer surface of said body, wherein said inner surface of said retractable sleeve is at least partially positioned about an outer surface of said bushing.

7. The adapter tool of claim 1, wherein said slot forms an angle with said longitudinal axis to translate longitudinal movement of said retractable sleeve to lateral movement of said engagement end of said spring, and said angle is between approximately 25 and 35 degrees.

8. The adapter tool of claim 1, further comprising an aperture extending into said second end of said body along said longitudinal axis to said interior volume, said aperture configured to receive a drill bit.

9. The adapter tool of claim 8, further comprising a body screw positioned proximate to said second end of said body, wherein said body screw extends into a side aperture of said body and is configured to secure said drill bit.

10. The adapter tool of claim 1, wherein said spring has a helical shape between a free end and said engagement end, wherein said engagement end comprises a plurality of straight segments with at least one straight segment extending across said angled aperture.

11. A combined drill and driver system, comprising:
an adapter tool having:
  a body having a longitudinal axis and an aperture forming an angle with respect to said longitudinal axis, wherein said angled aperture extends from an outer surface to an inner surface of said body, and said inner surface defines a partially enclosed volume, wherein said angled aperture is positioned proximate to a first end of said body, and a countersink cutter is positioned at an opposing second end of said body;
  a retractable sleeve disposed around said outer surface of said body and having an inner surface defining an inner cavity;
  a spring disposed around said outer surface of said body and at least partially positioned in said inner cavity, said spring having an engagement end at least partially positioned in said angled aperture of said body;
  a second tool removably interconnected and positioned in said partially enclosed volume, said second tool including a recess on a forward end,
  wherein, in a first state, said engagement end of said spring is wedged between a surface that defines said angled aperture and a surface of said second tool that defines said recess such that at least a portion of a cross-sectional area of said engagement end of said spring is positioned outside of said recess; and
  wherein, to transition from said first state to a second state, said retractable sleeve moves said engagement end of said spring against said surface that defines said recess such that said engagement end of said spring moves away from said longitudinal axis until said cross-sectional area of said engagement end of said spring is positioned outside of said recess in the second state.

12. The combined drill and driver system of claim 11, wherein said angle of said aperture is between approximately 25 and 35 degrees.

13. The combined drill and driver system of claim 11, wherein said recess of said second tool has a radiused cross-sectional shape.

14. The combined drill and driver system of claim 11, wherein said retractable sleeve has a first inner diameter and a second inner diameter, wherein said first inner diameter is substantially the same as an outer diameter of a bushing of said adapter tool and said second inner diameter is smaller than said first inner diameter to limit longitudinal travel of said retractable sleeve relative to said bushing.

15. The combined drill and driver system of claim 11, wherein in said first state, at least half of said cross-sectional area of said engagement end of said spring is positioned within said recess volume of said second tool.

16. The combined drill and driver system of claim 11, further comprising a second aperture extending into said second end of said body along said longitudinal axis to said partially enclosed volume, said second aperture configured to receive a drill bit.

17. The combined drill and driver system of claim 16, further comprising a body screw positioned proximate to said second end of said body, wherein said body screw extends into a side aperture of said body and is configured to secure said drill bit.

18. The combined drill and driver system of claim 11, wherein said spring has a helical shape between a free end and said engagement end, wherein said engagement end comprises a plurality of straight segments with at least one straight segment extending across said angled aperture.

* * * * *